April 1, 1958     G. B. DOREY     2,828,837
AUTOMATIC SLACK ADJUSTER
Filed Jan. 2, 1953     5 Sheets-Sheet 1
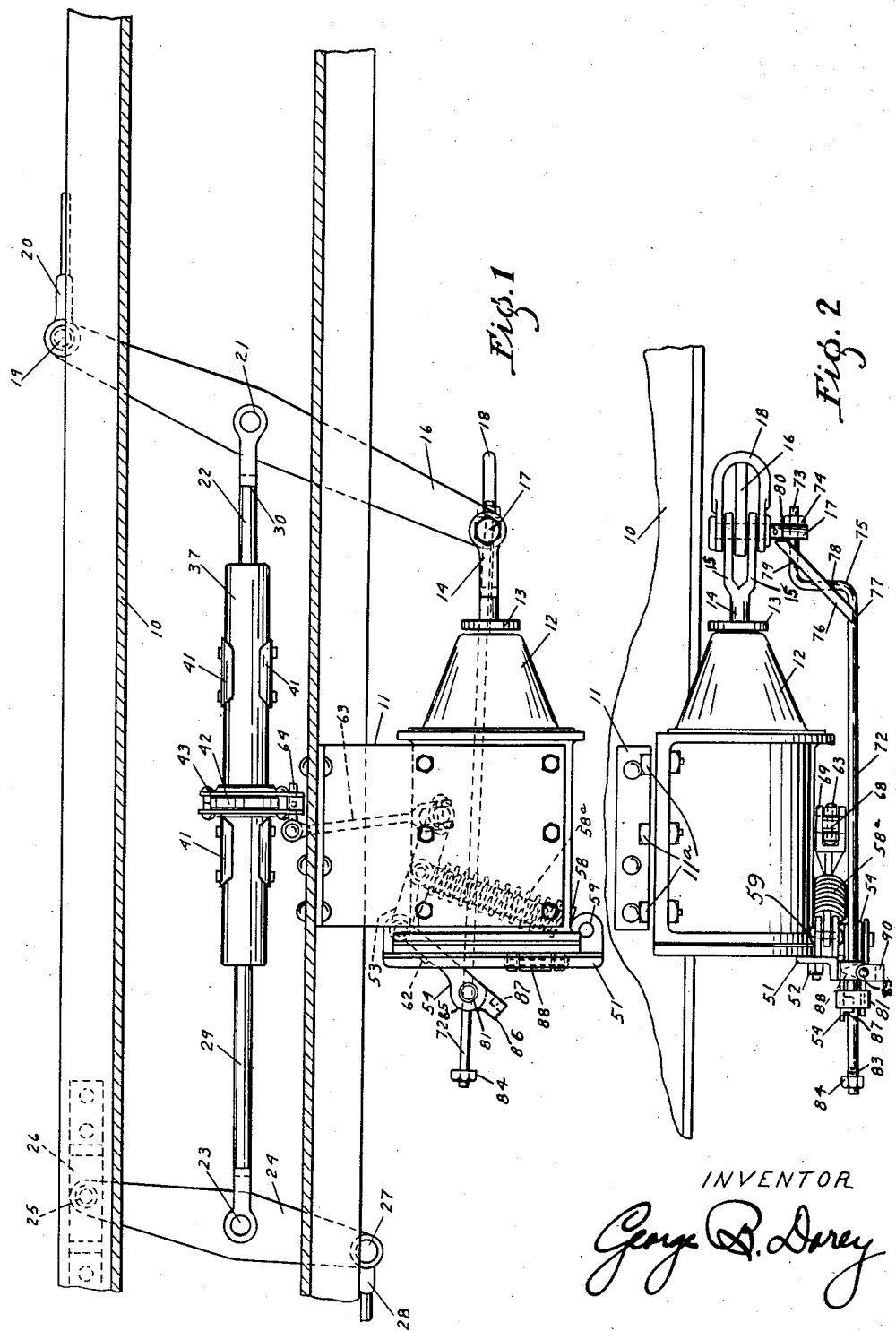
INVENTOR
George B. Dorey

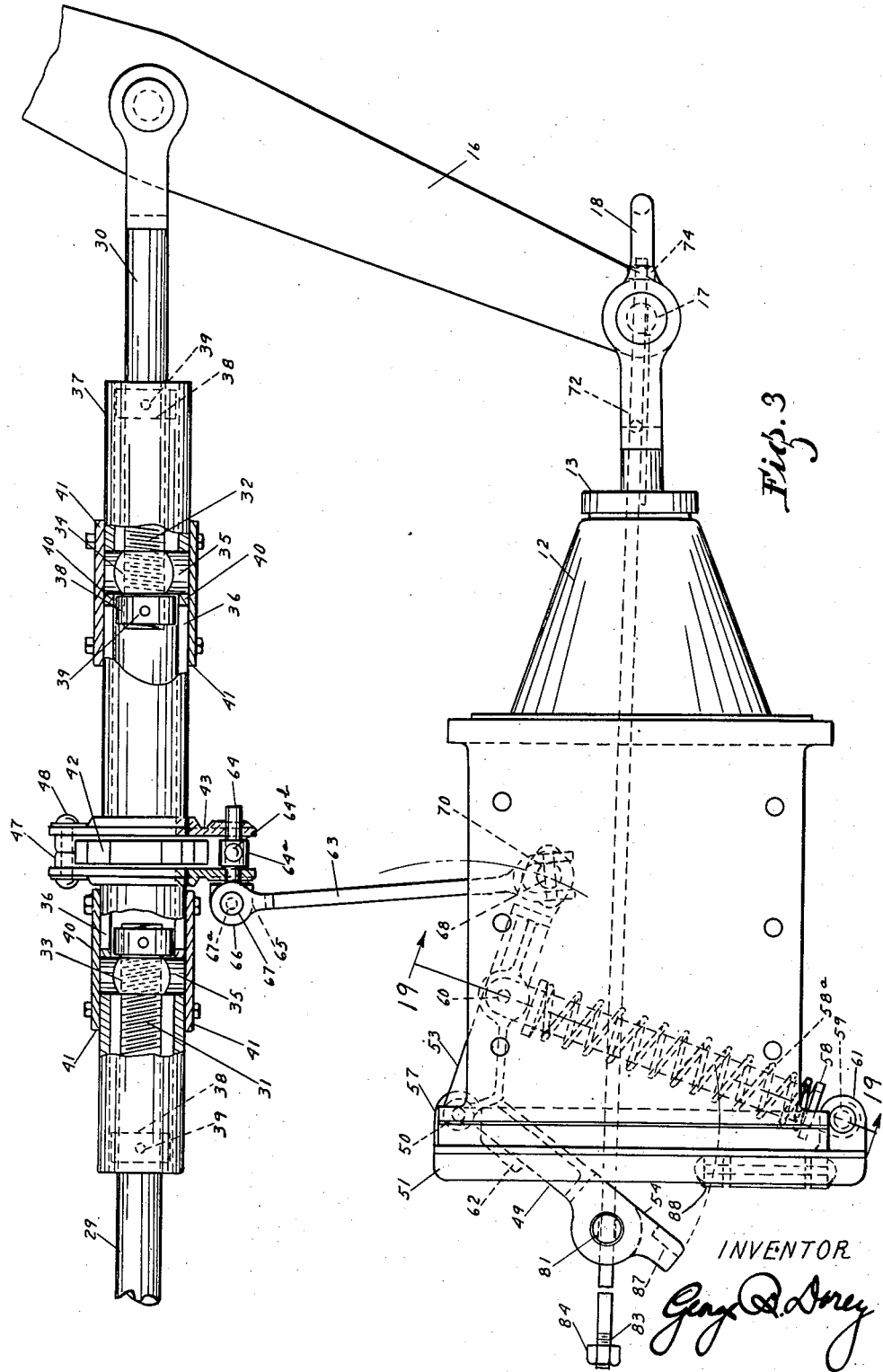

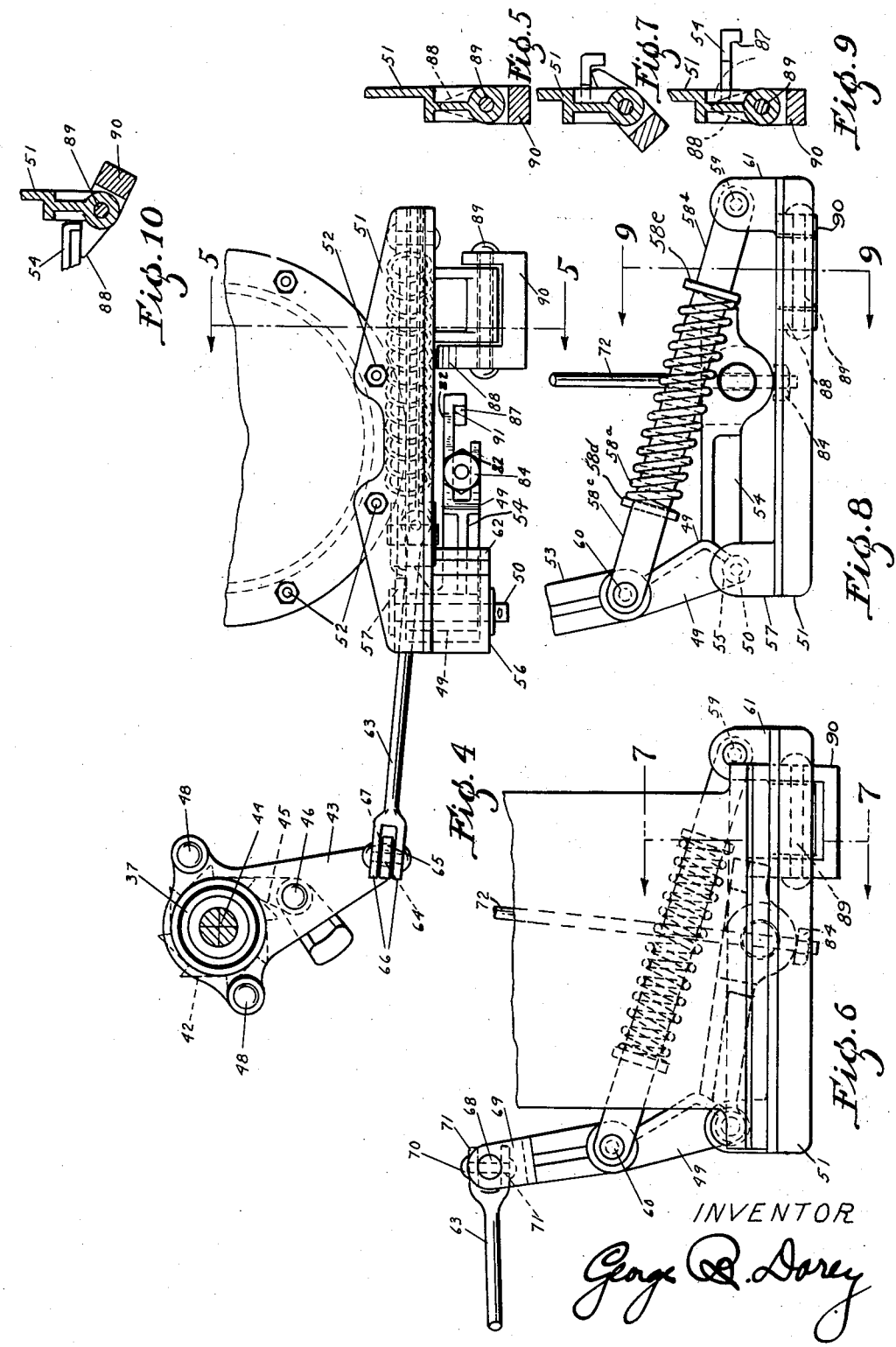

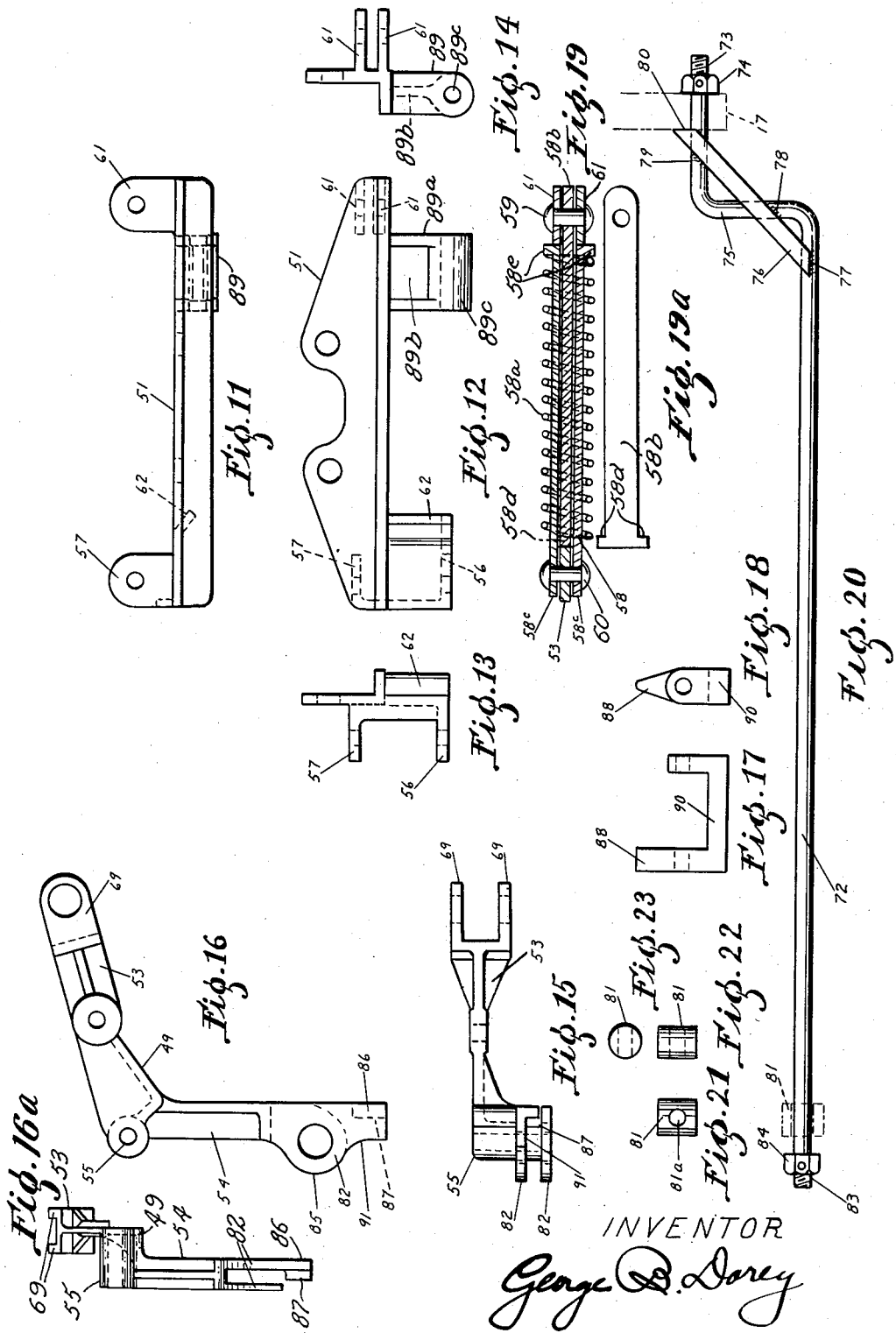

April 1, 1958 G. B. DOREY 2,828,837
AUTOMATIC SLACK ADJUSTER
Filed Jan. 2, 1953 5 Sheets-Sheet 5
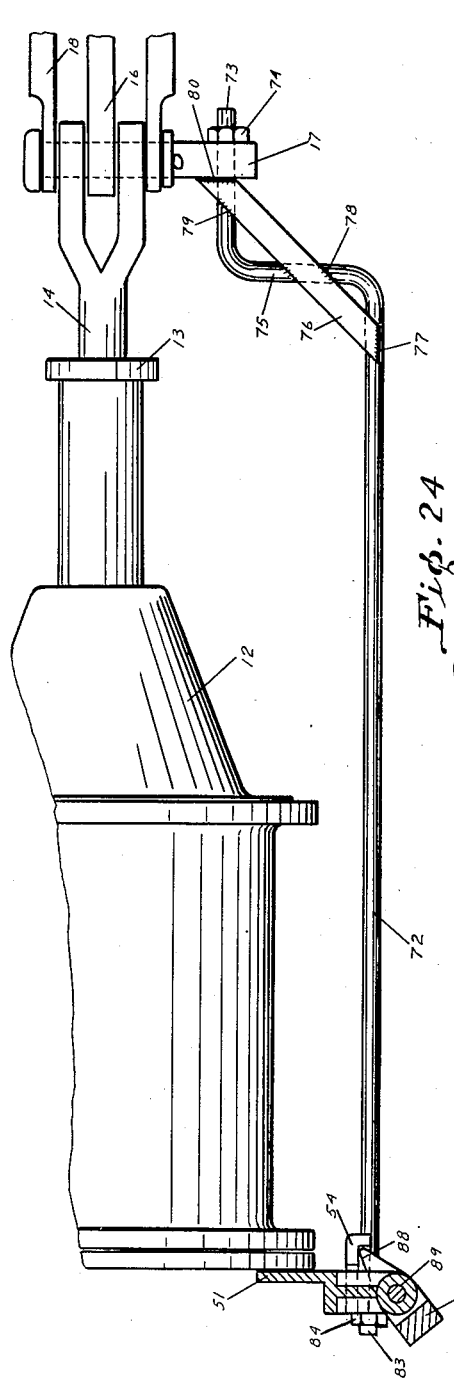
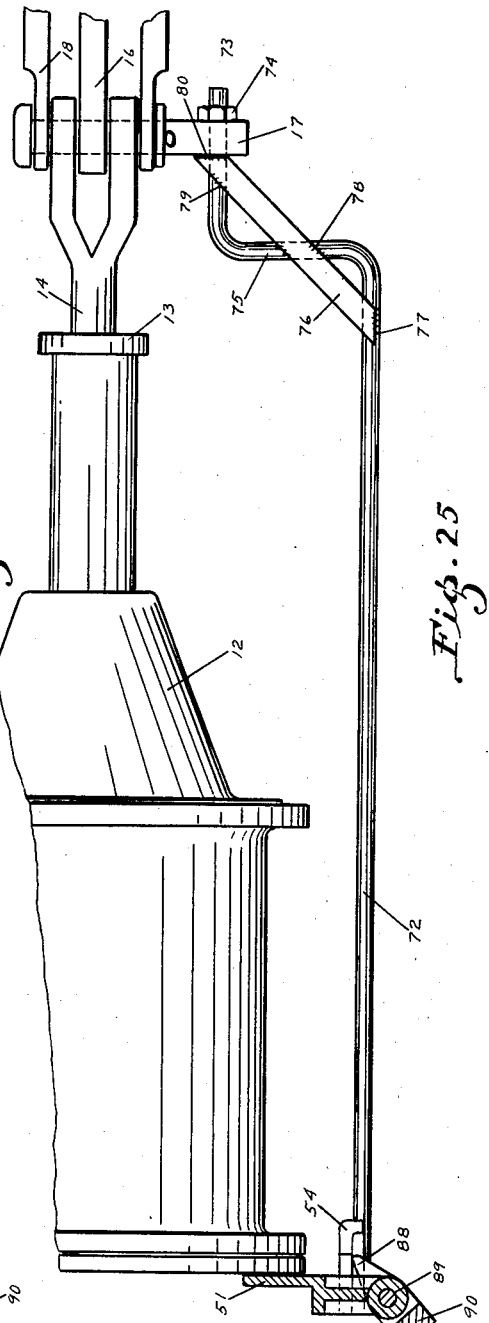
INVENTOR
George B. Dorey United States Patent Office 2,828,837
Patented Apr. 1, 1958

2,828,837

AUTOMATIC SLACK ADJUSTER

George B. Dorey, Westmount, Quebec, Canada, assignor to Continental Transport Appliances, Limited, Montreal, Quebec, Canada, a corporation of Canada Application January 2, 1953, Serial No. 329,336

7 Claims. (Cl. 188—196)

The invention relates to an improved type of automatic slack adjuster for taking up slack in the brake connections as wear in the brake shoes and connecting pins develops.

The improvement is particularly suitable for application to that type of brake system having a screw take-up device incorporated in the center connection which interconnects live and dead levers and wherein there is considerable longitudinal and lateral movement of the rod in relation to the brake cylinder and push rod. The wide variations in positions which the center connecting rod assumes in relation to the car structure has hitherto made it impractical to effect with accuracy a take-up movement in this rod by means of mechanism carried by a fixed part of the car structure and it is an object of this invention to remedy this condition.

The present invention incorporates the principle of retaining a spring energized and releasing the same to operate a take-up device at a predetermined extent of push rod travel as broadly claimed in my co-pending United States application Serial No. 152,061, filed March 23, 1950 now Patent No. 2,646,139 issued July 21, 1953, and thereby provide for the desired accuracy and overcome the former objections to the operation of a bodily movable take-up device by means of mechanism operating from a stationary location on the car structure.

The improved structure contemplates the use of a pivoted lever having an operating arm interconnected with a take-up device and a power arm interconnected with the push rod to move therewith upon application of the brake to energize an operating spring, the holding and release of which is controlled by a detent acting on the power arm of the lever in accordance with slack take-up requirements.

The release of the spring energy for operating the take-up device being thus under control of the power arm of the lever permits the employment of a long operating arm having a range of movement beyond that required for normal operation and having sufficient movement to take care of all variations in the relative positions between the connecting rod and lever and still maintain accurate adjustment of piston travel.

Another object of the invention is to provide a slack adjuster of the mechanically operated type which is available in packaged unit form with the parts furnished as assemblies ready to mount on the car structure and thus dispense with the necessity of making changes or additions to the car for the accommodation and mounting of the slack adjuster parts. Another and more specific object of the invention is to provide a slack adjuster operating device which is mounted directly on the main brake cylinder.

A further object of the invention is to provide a structure wherein the take up operation of a slack adjuster is delayed until such time as a laterally movable take up device has assumed substantially its outermost lateral position and can therefore be operated from a fixed location on the car structure to provide for reasonable uniformity of operation in the take up movement.

The invention further resides in details of construction associated with the slack adjuster operating lever and its mounting bracket and further in the relation between said lever and the take-up device and brake applying means.

For further comprehension of the invention reference may be had to the accompanying drawings wherein:

Figure 1 is a plan view of a portion of the underframe structure of a railway car incorporating as much of the brake rigging as necessary to illustrate the application of the improved slack adjuster mechanism, said view showing the brake parts and slack adjuster mechanism in released position.

Figure 2 is a side elevational view of the structure shown in Fig. 1.

Figure 3 is a detailed plan view on an enlarged scale of a portion of Fig. 1.

Figure 4 is a vertical end view showing the lower part of the cylinder and the take-up device shown in Fig. 3 as viewed from left to right of said Fig. 3.

Figure 5 is a fractional vertical sectional view taken on a line 5—5 of Fig. 4.

Figure 6 is a plan view of the rear portion of the brake cylinder showing the bell crank lever with the detent in engaging relation with the shoulder of the lever arm to retain the spring energized.

Figure 7 is a fractional vertical sectional view taken on a line 7—7 of Fig. 6 and showing the detent in engagement with the shoulder of the lever arm.

Figure 8 is a plan view of the bell crank lever and bracket assembly with the parts positioned as the shoulder of the lever arm overrides the detent and the pawl gravitates to its normal vertical position and release of the spring energy is effected.

Figure 9 is a fractional vertical view taken on a line 9—9 of Fig. 8.

Figure 10 is a view similar to Fig. 9 except that the detent is shown in the non-operative returning position preparatory to resuming its operative position.

Figure 11 is a detached plan view of the supporting bracket of the assembly.

Figure 12 is a vertical frontal view of the bracket shown in Fig. 11.

Figure 13 is an end elevational view of the bracket shown in Fig. 12 as viewed from left to right of the latter figure.

Figure 14 is an end elevational view of the bracket shown in Fig. 12 as viewed from right to left of the latter figure.

Figure 15 is a detached elevational side view of the bell crank lever.

Figure 16 is a plan view of the bell crank lever shown in Fig. 15. Figure 16a is a side elevational view of the lever shown in Fig. 16 as viewed from left to right.

Figure 17 is a detached frontal elevational view of the weighted detent.

Figure 18 is an end elevational view of the detent shown in Fig. 17 as viewed from right to left of the latter figure.

Figure 19 is a vertical longitudinal sectional view taken through the spring mechanism as seen on a line 19—19 of Fig. 3. Fig. 19a is a detached plan view of the spring inner yoke member.

Figure 20 is a detached side elevational view of the adjuster operating rod.

Figure 21 is a side elevational view of the bell crank and operating arm connecting pivot and rod guide.

Figure 22 is a side elevational view of the element shown in Fig. 21 as viewed from right to left.

Figure 23 is a plan view of the element shown in Fig. 22.

Figure 24 shows a side vertical elevational view of the air cylinder with the push rod moved forwardly and the spring held in energized relation and the parts positioned as in Figure 6 with certain parts broken away to better illustrate the locking action of the detent with the latter in engagement with the shoulder of the lower arm of the lever.

Figure 25 is a view similar to Figure 24 except that the push rod is shown as having moved forwardly from the position in Figure 24 a sufficient distance to bring the shoulder of the bell crank beyond the detent and allow the release of the spring tension.

In said drawings the underframe of the car structure is indicated by the center sills 10—10 having a bracket 11 secured thereto for supporting the usual air operated cylinder 12 which is preferably bolted thereto as at 11a. The cylinder is provided with a hollow push rod, the outer end of which is indicated at 13, and loosely mounted within the said hollow push rod is a push rod 14 which is formed at its outer end with a pair of jaws 15—15 which are spaced apart to accommodate therebetween a brake lever 16. The lever 16 is pivotally connected to the push rod by means of a pintle 17 and embracing said push rod jaws is a shackle 18 which like lever 16 is pivotally connected to the push rod and lever 16 by the pintle 17. The pintle 17 is extended appreciably below the shackle for a purpose as will hereinafter be pointed out.

The end of lever 16 opposite to the end which connects with the push rod pivotally connects at 19 with a top connection 20 which in turn leads to the brake gear of one of the trucks (not shown). The lever 16 intermediate its ends connects at 21 with a connecting rod 22 which in turn pivotally connects at 23 with a dead lever 24 which is pivotally mounted at 25 on a bracket 26. The lever 24 at the end opposite to pivot 25 pivotally connects at 27 with the top connection 28 leading to the adjacent truck (not shown).

The connecting rod 22 is divided lengthwise into two sections as indicated at 29 and 30 and the adjacent ends of the respective sections are screwthreaded to present right and left hand screwthreaded ends as indicated at 31 and 32 respectively. The screwthreaded ends of the rod sections are fitted with complementary screwthreaded nuts 33 and 34 and said nuts are provided with trunnion extensions 35 which are held within slotted apertures 36 of a tubular housing 37. The housing 37 forms the outer casing of a take-up device and the nuts by reason of the interfitting between the trunnions 35 and apertures 36 rotate with the housing thereby varying the length of the connection by rotation of the housing. The rods on each side of the nuts are provided with bearing collars 38 which are disposed in axially spaced relation on the associated rods and maintained against axial displacement on their respective rods by pins 39. The nuts are maintained against axial displacement in the slots 36 by means of abutments 40 formed on cover plates 41.

Rotation of the take-up device is effected by means of lever and ratchet mechanism which includes a ratchet wheel 42 fixedly mounted on the housing 37 and lever arms 43—43 loosely mounted for free revoluble movement around the axis of rotation 44 of the take-up device and located between said lever arms 43—43 is a pawl 45 which is mounted for pivotal movement on trunnions 46 formed integrally with the arms 43. The pair of arms 43—43 are maintained in spaced relation by spacing lugs 47 through which rivets 48 extend to retain the pair of plates together. The pawl 45 is adapted to engage with the ratchet wheel 42 when the pair of lever arms 43 are swung in one direction and independently thereof when swung in the opposite direction thus providing a clutch connection between the lever arms and the take-up device.

Rotation of the take-up lever 43 is effected through the medium of a bell crank lever 49 which is pivotally mounted on one side of the connecting rod by a vertically disposed pivot 50 on a bracket 51. The bracket 51 preferably extends crosswise of the cylinder and is secured thereto by two of the bolts 52 of the cylinder pressure head.

The lever 49 includes angularly related arms as indicated at 53 and 54, said arms extending from a hub like portion 55 (Figs. 15 and 16) at the junction of the lever arms, said hub being apertured to receive the pivot pin 50 which also extends through flanges 56 and 57 of the bracket. The said arms 53 and 54 are spaced axially from each other with the arm 53 disposed on a higher level than the arm 54. Spring mechanism 58 extends from the arm 53 to the end of the bracket 51 remote from the pivot 50.

The spring mechanism 58 includes a coil spring 58a which is interposed between the shoulders of yoke members 58b and 58c (Fig. 19) which extend within the spring and the ends of the respective yoke members pivotally connect with the bracket 51 at 59 and with the arm 53 at 60. The shoulders of the yoke member 58b extend laterally outwardly from the body as indicated at 58d (Fig. 19a) and the shoulders of yoke member 58c extend vertically from the body as indicated at 58e (Fig. 19). The bracket 51 is provided with a pair of flanges 61 between which the yoke member 58b is received and which take the pivot 59. The spring is placed under initial tension and a limiting abutment at 62 (Fig. 3) extends vertically upwardly from the flange 56 of the bracket and limits swinging movement of the lever in the spring releasing direction.

A link 63 extends between the outer end of arms 53 and the lever arms 43, said link being connected at each end by means of universal joint connections. The connection between link 63 and lever arms 43 includes a pivot pin 64 extending through the pair of arms 43 and held against axial movement by an encircling ferrule 64a which is positioned between the pair of arms 43—43 and riveted to the pivot 64 by a rivet 64b. One end of the pivot 64 outwardly of the lever arms 43 is provided with a headed section 65 (Fig. 4) and said head is received between jaws 66—66 formed on the link 63 and pivotally connected thereto at 67.

The connection between link 63 and the bell crank arm 53 includes a pintle 68 (Fig. 6) extending through a pair of jaws 69—69 formed on the outer end of the lever arm 53 and said pintle 68 in turn is apertured to receive a pintle 70 which extends through a pair of jaws 71—71 of the link 63. There is thus provided for a wide degree of universal movement between the bell crank member and the lever arm 43 which allows for considerable variation in lateral and longitudinal movement between the connection rod and bell crank lever member.

The spring is adapted to be compressed between the shoulders of the yoke members during the brake applying movement of the push rod and to this end a connection rod 72 (Fig. 1) extends between the arm 54 and the push rod pintle 17 and extends therethrough to present a screw-threaded extension 73 which receives a complementary screw-threaded nut 74 thereby forming a shoulder which engages with the pintle 17 and causes the rod 72 to move with the push rod in a forward direction. The rod 72 is offset as indicated at 75 and the offset is reinforced by a bracket plate 76 which is welded to the various sections of the offset as indicated at 77, 78 and 79 and the upper portion of the plate 76 forms an abutment 80 which engages the push rod pintle and thus in combination with nut 74 holds the rod in fixed relation to the pintle.

The connection between the lever arm 54 and the rod 72 includes a circularly shaped pivot guide 81 which is pivotally mounted in spaced guiding walls 82 (Fig. 4) and said guide 81 is apertured at 81a (Fig. 21) to slidingly accommodate the rod 72 therethrough. The rod 72 extends between the guide walls 82 and thus serves to hold the guide 81 against axial displacement. The rod 72 projects beyond the guide walls 82 and is screwthreaded at its outer end at 83 to receive a nut 84 which forms an abutment which engages with the peripheral surface 85 of the walls 82. The rear abutment of the rod 72 in the fully released position of the brake is shown as spaced appreciably from the peripheral surface 85 of the lever thus allowing for complete take up movement of the bell crank lever even though the brake may not be sufficiently released to allow the bottoming of the push rod and conversely movement of the bell crank lever to energize the spring does not take place until abutment 84 engages the surface 85 of the lever. During the free movement of the abutment 84 as the push rod moves forwardly the lever 16 swings on the pivot 21 and the rod 22 with the take up device is moved laterally outwardly to substantially its outermost lateral position before operating movement of the bell crank lever is initiated. The restricting of the operation of the take up device to become effective only when the said take up device has attained substantially its outermost lateral position assures precision of operation inasmuch as the distance between the bell crank and the take up device will then be substantially uniform thoughout the operation of the slack adjuster. The extent of push rod travel at which adjustment is to be made is regulated by the peripheral spacing of the teeth 45 and the length of the lever arm 43 in relation to the length of the arms of the bell crank lever.

The lever arm 54 is extended beyond the walls 82 as indicated at 86 and said extension on its underside is provided with a shoulder 87 and in the path of movement of said shoulder there is provided a detent 88 which is pivoted at 89 on a downward extension 89a of the bracket. The said extension includes a centrally disposed web 89b and a lower hinge section 89c. The detent of the pawl engages with the shoulder 87 at a predetermined extent of push rod travel (Figs. 6, 7 and 24).

The said detent (Fig. 25) is weighted at 90 to bias the detent upwardly into engagement with the shoulder 87 of the lever and thereby retain the spring under tension until release of the later is effected upon further travel of the push rod to the extent where the surface 91 of the extension 86 overrides the nose of the detent and thereby allows the latter to gravitate to a substantially vertically released position (Figs. 8 and 9).

In the particular embodiment of this invention shown, the rear abutment 84 of the rod 72 in the fully released position of the brakes is shown as spaced appreciably from the peripheral surface 85 of the lever thus allowing for complete take-up movement of the bell crank lever even though the brake may not be released sufficiently to allow the bottoming of the push rod.

It will be noted that the engagement between the shoulder 87 and the detent is effected on an arc of greater extent than the actual arc of movement of guide 81 and provision is thereby made for an adequate range of movement to permit the employment of a detent of generous proportions.

The arrangement of the parts predicated on operating with accuracy the longitudinally and laterally movable take up device from a stationary location on the car structure is made possible by retaining the spring energized until a predetermined extent of push rod travel is attained. The retention of the spring pressure and release of the same is effected by means of the detent 88 in cooperation with the shoulder 87. The detent 88 as shown in Figure 5 is normally maintained in a substantially vertical position and in this position lies in the path of swinging movement of the shoulder 87 of the lever arm 54 and is arranged to be displaced by the latter upon forward movement of the push rod. Upon the application of the brake the push rod is moved forwardly and the detent 88 then drops into engagement with the shoulder 87 as shown in Figures 6, 7 and 24 and prevents return of the arm 49 and thus maintains the spring under tension. Continued forward movement of the push rod from the position shown in Figure 24 ultimately brings the detent 88 to the position shown in Figures 8, 9 and 25 when the surface 91 overrides the detent and the latter is then returned to the vertical position as shown in Figures 3 and 5 permitting the return of the arm 54 to release position under the influence of the released energy of the spring. In the course of the return movement of the arm 54 to release position the detent 88 is moved to an inoperative position as shown in Figure 10 and the parts return to the position shown in Figure 3. It will thus be seen that the entire take up operation is controlled by the extent of movement of the push rod and the spring tension is held until the predetermined extent of push rod travel is attained.

The operation and advantages of the improved mechanism may be best understood by following out the sequence of operations involved in a brake applying operation as follows:

Assuming the parts to be in released position as shown in Figures 1 to 3 inclusive, the admission of air in the cylinder operates to move the push rod 14 in a forward direction taking along the connecting rod 72 which meanwhile slides through the guide 81 until the nut 84 contacts the peripheral surface 85 of the bell crank lever whereupon continued forward movement of the push rod swings the bell crank about its pivot 50. The swinging movement of the bell crank in the indicated direction moves the link 63 outwardly towards the connecting rod and swings the lever 43 therewith which by reason of the pawl and ratchet connection swings independently of the take-up device, the spring 58a meanwhile being compressed. As the swinging movement of the bell crank lever accompanies the forward movement of the push rod, the shoulder 87 of the lever passes beyond the detent 88 and if the required piston travel is not exceeded the spring returns the lever only to the extent necessary to retain the detent and shoulder in engagement. The brake releasing movement is then continued with the spring tension retained and subsequent brake applications pick up the spring tension returning to engaging relation between the shoulder and detent after each application until such time as sufficient slack develops in the system as to cause the shoulder to entirely override the detent and allow the latter to gravitate to the non-operative position as seen in Figures 1 and 9, whereupon the spring energy is released and the bell crank returns to released position taking along the link 63 and rotating the arm 43 which now is in clutching engagement with the take-up device and the latter is rotated in a take-up direction.

The employment of a bell crank lever having an operating arm interconnected with the take-up device and a power arm interconnected with the push rod in combination with an operating spring adapted to be tensioned by movement of the power arm with movement of the latter under control of restraining means to prevent release of the spring energy until a predetermined extent of push rod travel is attained thus provides a mechanism having the essentials of simplicity and precision of operation.

What I claim as new is:

1. In an automatic slack adjuster mechanism for a railway car braking system having brake applying means including an air operated power cylinder and a push rod actuated thereby, said push rod being connected to one end of a lever whose intermediate portion thereof is pivoted to a connecting rod having a take-up device therein operable by rotation for shortening the rod and thereby adjusting push rod travel to compensate for slack in the system, the herein described improvement in said slack adjuster mechanism including a bell crank lever mounted on the cylinder and having the respective arms thereof connected with the take-up device and push rod respectively; a spring connected to the bell crank lever for operating the latter in a direction to take up slack, said spring being energized by movement of the push rod in a brake applying direction; and means for retaining the spring energized independently of the push rod, said means including a pawl pivotally mounted at a location fixed with respect to the air cylinder and a shoulder on one of the arms of the bell crank lever engaging with the pawl, said shoulder at a predetermined extent of push rod travel moving beyond the pawl to override the same and release the spring energy.

2. In an automatic slack adjusting mechanism for a railway car braking system having brake applying means including an air operated cylinder and a push rod actuated thereby, said push rod having a pintle connected to one end of a live lever whose other end is pivotally connected to a portion of said braking system and whose intermediate portion thereof is pivotally connected to a connecting rod and thereby connected pivotally to the intermediate portion of a dead lever having a fixed pivot at one end and pivotally connected at the other end to the remaining portion of said braking system, said slack adjusting mechanism comprising a rotatable screw take-up device interposed in the connecting rod between the levers; a lever and pawl and ratchet device on the take-up device for rotating the take-up device by ratcheting motions of the lever; and herein described improved means for operating the lever including a bell crank lever pivotally mounted on the operating cylinder, said lever having angularly related arms respectively connected with the operating lever of the take up device and with the push rod respectively; means for operating the bell crank lever in a direction for taking up slack including a spring connected to one arm of the bell crank lever, said spring being energized by swinging movement of the bell crank upon movement of the push rod in a brake applying direction; and detent mechanism co-acting with one arm of the bell crank lever to hold the spring energized independently of the push rod until a predetermined extent of push rod travel is attained, said means including a shoulder on the related arm of the bell crank lever and a pawl co-operating with the shoulder, said shoulder upon attainment of a predetermined extent of push rod travel moving beyond the pawl to override the same and release the spring energy for moving the bell crank lever in a direction to rotate the take up device.

3. In an automatic slack adjusting mechanism for the braking system of a railway car having a power operated cylinder and a movable push rod actuated thereby for applying the brake, said braking system including a take up device operable by rotation for varying the relation between certain of the parts; said adjusting mechanism including a clutch connected operating swinging lever caried by the take up device for rotating the take up device when swung in one direction and freely swingable in declutched relation in the opposite direction; a bracket mounted on the cylinder and extending crosswise thereof; a bell crank lever pivotally mounted adjacent one end of the bracket, said lever having one arm connected with the push rod and the adjacent arm connected with the operating lever of the take up device; and a spring extending between the last named arm of the bell crank lever and the end of the bracket remote from the bell crank lever fulcrum, said spring being energized by movement of fhe push rod in a brake applying direction; and means for retaining the spring energized independently of the push rod, said means including a shoulder on the bell crank lever and a pawl pivotally mounted on the bracket and having a detent engaging with the shoulder of the bell crank lever at a predetermined extent of push rod travel.

4. The structure according to claim 3 wherein the shoulder overrides the detent upon attainment of predetermined push rod travel and the spring energy is released to swing the operating lever of the take-up device in clutched relation and thereby rotate the take-up device in the take-up direction and remove slack from the system.

5. In a slack adjuster for the brake system of a railway car having an air operated cylinder and a push rod actuated thereby for applying the brake and a brake lever pivotally connected to the push rod and a connection rod pivoted to the brake lever at an appreciable distance from the push rod, said connection rod being longitudinally and laterally movable in conformity with the swing of the brake lever and including therein a take up device operable by rotation to vary the length of the connection and thereby compensate for slack in the brake system, said take up device having a toothed ratchet wheel fixedly mounted thereon and an operating lever pivotally mounted adjacent the ratchet wheel and having clutch engagement with the latter when the lever is swung in one direction and having free swinging movement in the opposite direction independently of rotation of the ratchet wheel; means for operating the lever of the take up device from a location fixed with respect to the air operated cylinder and delaying said operation until the take up device has assumed substantially its outermost lateral position, said means including a bell crank lever pivoted at a location fixed with respect to the operating cylinder, and having one arm connected with the operating lever and the opposite arm connected with the push rod and a spring tensioned by movement of the bell crank lever upon movement of the push rod in a brake applying direction; and stop means for limiting swinging movement of the bell crank lever at the completion of each take up movement, said stop means being so located as to provide an extent of free movement of the connection between the bell crank lever and push rod to permit sufficient swinging movement of the brake lever independently of any movement of the bell crank lever to dispose the take up device in substantially its outermost lateral position before the take up operation becomes effective.

6. In an automatic slack adjusting mechanism for the braking system of a railway car having a power operated cylinder and movable push rod actuated thereby for applying the brake, said braking system including a take-up device operable by rotation for varying the relation between certain of the parts; said adjusting mechanism including a clutch connected operating swinging lever carried by the take-up device for rotating the latter when the lever is swung in one direction and swingable in declutched relation when swung in the opposite direction; the herein described improved mechanism for operating the take-up device including: a bracket stationarily mounted with respect to the cylinder; a bell crank lever pivotally mounted adjacent one end of the bracket, said lever having angularly related arms respectively connected with the operating lever of the take-up device and the push rod; means for operating the bell crank lever in a direction to take up slack including a spring connected to one of the arms of the bell crank lever, said spring being energized by swinging movement of the bell crank lever upon movement of the push rod in a brake applying direction; and means for retaining the spring energized independently of the push rod, said means including a depending lug on the bracket positioned at a location beyond the path of swinging movement of the bell crank lever and a pawl straddling the lug and pivoted to the latter, said pawl having a detent lying in the path of swinging movement of the bell crank lever and a shoulder on the bell crank lever engageable with the detent for holding the spring energized, said pawl being counterweighted to bias the detent into holding engagement with the shoulder, said bell crank lever upon the attainment of a predetermined extent of swinging movement moving beyond the detent to override the latter and release the spring energy for operating the take-up device.

7. In an automatic slack adjusting mechanism for the braking system of a railway car having a power operated cylinder and a movable push rod actuated thereby for applying the brake, said braking system including a take-up device operable by rotation for varying the relation between certain of the parts, said adjusting mechanism including a clutch connected operating swinging lever carried by the take-up device for rotating the said take-up device when the lever is swung in one direction and freely swingable in declutched relation when swung in the opposite direction; a bracket stationarily mounted with respect to the cylinder; a bell crank lever pivotally mounted on the bracket, said lever having angularly related arms respectively connected with the operating lever of the take-up device and the push rod; means for operating the bell crank lever in a direction for taking up slack including a spring connected to one arm of the bell crank lever upon movement of the push rod in a brake applying direction; and means for retaining the spring energized independently of the push rod, said means including: a lug on the bracket lying beyond the path of swinging movement of one of the arms of the bell crank lever, a pawl pivotally mounted on the lug and a shoulder on the last named arm engageable with an end of the pawl; said shoulder at a predetermined extent of push rod travel moving beyond the pawl to override the latter and release the spring energy, said pawl being of saddle shape to present spaced walls straddling the lug and having a weighted portion for biasing the pawl into holding engagement with the shoulder of the bell crank lever arm.

References Cited in the file of this patent

UNITED STATES PATENTS

| | | |
|---|---|---|
| 1,961,919 | Anderson | June 5, 1934 |
| 2,646,140 | Dorey | July 21, 1953 |
| 2,646,141 | Dorey | July 21, 1953 |